United States Patent
Keisel et al.

(10) Patent No.: US 6,907,913 B1
(45) Date of Patent: Jun. 21, 2005

(54) TIRE MOUNTING DEVICE AND METHOD

(75) Inventors: Kevin L. Keisel, Cochranton, PA (US);
Edward Clayton, Guys Mills, PA (US);
Ronnie Urquhart, Meadville, PA (US);
David Corner, Saegertown, PA (US)

(73) Assignee: C & J Industries, Inc., Meadville, PA (US)

( * ) Notice: Subject to any disclaimer, the term of this patent is extended or adjusted under 35 U.S.C. 154(b) by 20 days.

(21) Appl. No.: 10/706,123

(22) Filed: Nov. 12, 2003

(51) Int. Cl.[7] .............................................. B60C 25/05
(52) U.S. Cl. ...................................................... 157/1.2
(58) Field of Search .............................. 157/1.1, 1.17, 157/1.2, 1.22, 1.24

(56) References Cited

U.S. PATENT DOCUMENTS

| | | | |
|---|---|---|---|
| 3,156,289 A | * | 11/1964 | Dragoo et al. ................ 157/1.2 |
| 3,958,618 A | | 5/1976 | Reuther |
| 4,109,698 A | * | 8/1978 | West et al. .................... 157/1.2 |
| 4,133,363 A | | 1/1979 | Gardner |
| 4,148,348 A | | 4/1979 | French et al. |
| 4,393,914 A | * | 7/1983 | Leeper ......................... 157/1.2 |
| 4,529,024 A | | 7/1985 | Vijay |
| 4,592,920 A | | 6/1986 | Murtfeldt |
| 4,784,203 A | | 11/1988 | Weiden |
| 4,830,079 A | | 5/1989 | Onuma |
| 4,969,499 A | | 11/1990 | Ashman |
| 5,088,539 A | | 2/1992 | Mannen et al. |
| 5,094,847 A | | 3/1992 | Yazaki et al. |
| 5,186,972 A | | 2/1993 | Williams et al. |
| 5,232,035 A | | 8/1993 | Adams, Jr. |
| 5,451,424 A | | 9/1995 | Solomon et al. |
| 5,464,650 A | | 11/1995 | Berg et al. |
| 5,470,603 A | | 11/1995 | Staniforth et al. |
| 5,472,034 A | | 12/1995 | Corghi |
| 5,656,108 A | | 8/1997 | Sakamoto et al. |
| 5,678,621 A | | 10/1997 | Trant |
| 5,820,709 A | | 10/1998 | Matsuda |
| 5,826,319 A | | 10/1998 | Colwell et al. |
| 6,145,566 A | | 11/2000 | Kliskey |
| 6,182,735 B1 | * | 2/2001 | du Quesne .................. 157/1.17 |
| 6,273,171 B1 | | 8/2001 | Kliskey |
| 6,453,971 B2 | | 9/2002 | Vignoli |

* cited by examiner

*Primary Examiner*—Jacob K. Ackun, Jr.
(74) *Attorney, Agent, or Firm*—Frederick L. Tolhurst, Esq.; Cohen & Grigsby, P.C.

(57) ABSTRACT

A device and method for mounting a tire (20) on a wheel (22) wherein the wheel is secured to a mounting table (48) and the tire is secured between the fingers (62) of a pivot arm (54). The pivot arm swings the tire into a position over the wheel wherein a sector of the tire beads (30 and 32) are laterally opposite the radial perimeter surface (38) of the wheel. The pivot arm is then advanced toward the mounting table so that the sector of the tire beads (30 and 32) contacts the radial perimeter surface (38) that is defined between the flanges (42 and 44) of the wheel (22). A button arm (66) advances toward the wheel (22) in an axial direction to cause a second sector of the tire beads (30 and 32) to pass over one of the wheel flanges (42 or 44) and position the tire beads within the second sector within a well (40) that is defined between the flanges (42 and 44) of the tire (22). The pivot arm then releases the tire and the button arm retracts from the tire.

24 Claims, 8 Drawing Sheets

TIRE MOUNTING DEVICE AND METHOD

BACKGROUND OF THE INVENTION

1. Field of the Invention

The disclosed invention relates to machines and devices for mounting tires on wheels and, more particularly, methods and apparatus for mounting pneumatic tires on rigid wheels.

2. Description of the Prior Art

Many types and styles of tire mounting machines and tools are known in the prior art. Various examples of tire mounting machines are shown and described in U.S. Pat. Nos. 3,958,618; 5,826,319; 5,678,621; and 4,969,499 in which the wheel is mounted on a table and rotated angularly with respect to tire mounting tools. In some cases, the tire is secured as a fixed position such as shown in U.S. Pat. No. 4,830,079. In other cases, the tools are mounted in a fixed position and the wheel and tire are rotated such as shown in U.S. Pat. Nos. 5,088,539 and 4,784,203. Still other patents such as U.S. Pat. Nos. 6,145,566; 6,273,171; 6,453,971; 5,472,034; 4,133,363; 4,529,024; and 5,232,035 disclose various modifications for tools that are used to mount tires.

In all of these prior art schemes, tires are mounted according to the method whereby the bead of the tire is passed over the bead retaining rims of the wheel by causing a mounting tool to travel in an angular direction with respect to the wheel so as to stretch the bead of the tire over the bead retaining rim. It takes substantial time to mount a tire according to this method. Furthermore, as documented in several of the cited references, this method requires a distortion of the tire that can sometimes damage the tire. Accordingly, there was a need in the prior art for an apparatus and a method of mounting tires on a wheel that would be faster and that wold also be less prone to damaging the tire.

SUMMARY OF THE INVENTION

In accordance with the presently disclosed tire mounting device and method, a mounting table secures a wheel while a pivot arm grips an angular sector of a tire and moves the tire into partial engagement with the wheel. The pivot arm initially positions the tire on the wheel such that the wheel partially protrudes through the center aperture of the tire. The pivot arm is then moved radially with respect to said wheel so that the inner and outer beads of said tire within said angular sector contact said wheel laterally between the inner and outer bead retaining flanges of the wheel. A press arm is then moved against a second angular sector of the tire. The second angular sector is located on the tire at an angular position that is substantially opposite from the angular position of the first angular sector. The press arm forces both the inner and outer beads of said tire within said second angular sector to pass one of the inner or outer beads retaining flanges of said wheel. The pivot arm then releases the first angular sector of the tire and the press arm moves away from contact with the second angular sector of the tire to allow the tire to return to its initial shape.

Preferably, the tire is inflated after it is released by the pivot arm and the press arm. Also preferably, the pivot arm has a clamp at one end that clamps the first angular sector of said tire to secure said tire therein. Also preferably, the pivot arm pivots between a first position where said clamp secures the first angular sector of the tire, and a second position wherein the pivot end of the gripper arm is advanced radially toward the wheel that is mounted on the table.

Other details, objects and advantages of the subject invention will become apparent to those skilled in the art as a more detailed description of a presently preferred embodiment thereof and a presently preferred method for practicing the same proceeds.

BRIEF DESCRIPTION OF THE DRAWINGS

A presently preferred embodiment of apparatus according to the disclosed invention and a method for practicing the same is shown and described in connection with the accompanying drawings wherein.

DESCRIPTION OF A PRESENTLY PREFERRED EMBODIMENT OF THE DISCLOSED INVENTION AND METHOD FOR PRACTICING THE SAME

A presently preferred embodiment of the disclosed invention and a method for practicing the same are shown and described in connection with FIGS. 1–8 wherein a tire 20 is shown mounted on a wheel 22. Tire 20 is of a conventional pneumatic type tire wherein a tread surface 24 defines the outer perimeter of tire 20. An inner side wall 26 is joined to one edge of the tread 24 and an outer side wall 28 is joined to the opposite edge of the tread. Side walls 26 and 28 have terminal bead surfaces 30 and 32 respectively which together define the inner porthole 33 of the tire 20.

Wheel 22 is also of a conventional type that is in the general shape of a rigid spool that rotates about an axis 34 and has a radial dimension 36. In a cross-section of wheel 22 taken along axis 34, the outer perimeter surface 38 of wheel 22 defines a well 40 that is located at an axial position between an inner bead retainer wall or flange 42 and an outer bead retainer wall or flange 44.

In the preferred embodiment of FIGS. 1–8, the tire mounting device includes a frame 46 to which other components of the device are secured. The device further includes a mounting table 48 having a mounting surface 50. In the presently disclosed embodiment, mounting table 48 is shown as a stationary table that is directly secured to frame 46. However, it will be readily apparent to those skilled in the art that alternative embodiments that are also within the scope of the invention herein disclosed include various types of conveyor lines having a number of work stations that are successively indexed to a working position relative to frame 46. As another alternative, mounting table 48 could also be in the form of a continuous conveyor having a plurality of work stations with the other components of the tire mounting device being secured to frame 46 in a translatable manner so that the tire 20 can be mounted to wheel 22 as wheel 22 continuously moves with respect to frame 46. Such alternatives are within the knowledge of one skilled in the art and are not further detailed herein.

Preferably, mounting table 48 includes a mechanism for securing the wheel 22 to the mounting table 48. An example of such a mechanism is shown in FIGS. 1–8 as a chuck 52, although alternative mechanical fastening devices such as are known in the prior art could also be used.

A gripper arm or pivot arm 54 is connected to frame 46 at a location adjacent to mounting table 48. Pivot arm 54 moves tire 20 from a first location that could, for example, be a tire supply conveyor, to a second location in which the tire 20 is partially engaged with the wheel 22. More specifically, the inner and outer bead surfaces 30, 32 within an angular sector $\emptyset_1$ of tire 20 are located in well 40 of wheel 22 as hereafter is more fully explained. In the disclosed embodiment, pivot arm 54 has a pivot end 56 that is secured to frame 46 through a pivot joint 58 at a location that is laterally adjacent to mounting table 48. Pivot end 56 and pivot joint 58 are laterally moveable with respect to said mounting table 48. As shown in FIGS. 1–4, at one limit of travel, pivot end 56 and pivot joint 58 are at an open position in which they are at the maximum lateral distance from mounting table 48. As shown in FIGS. 5–7, at the opposite limit of travel, pivot end 56 and pivot joint 58 are at a closed position in which pivot end 56 is laterally closer to mounting table 48.

Figure 1:
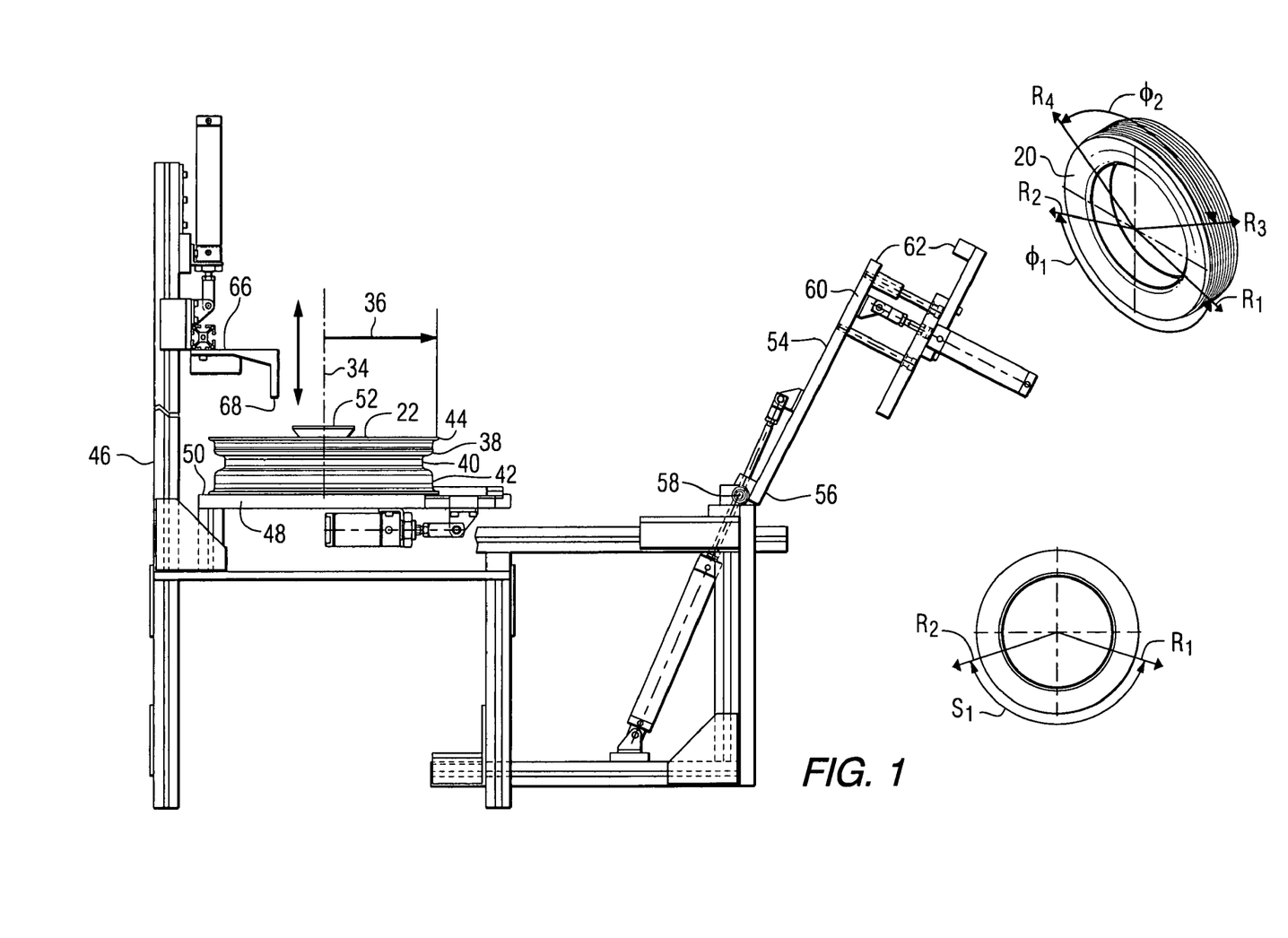
FIG. 1 is a side view of the disclosed tire mounting device wherein the pivotal arm is in an initial angular position with the fingers thereof are in an open position and wherein the press arm is raised.

Pivot arm 54 further includes a grip end 60 that is oppositely disposed on pivot arm 54 from the pivot end 56. Grip end 60 includes fingers 62 that are spaced apart from each other and that close together and move apart in response to pneumatic actuators. Alternatively, other types of power actuators such as hydraulic actuators can also be used. Fingers 62 move between an open position and a closed position. In the open position as shown in FIGS. 1 and 8, the separation between fingers 62 in a normal direction is a dimension that is greater than the width of tire 20. In the closed position as shown in FIGS. 2–7, the normal separation between fingers 62 in a normal direction is a dimension that is less than the width of tire 20. Thus, when fingers 62 are in the open position, a tire 20 can be inserted therebetween and when fingers 62 are in the closed position, they secure tire 20 therebetween.

Figure 2:
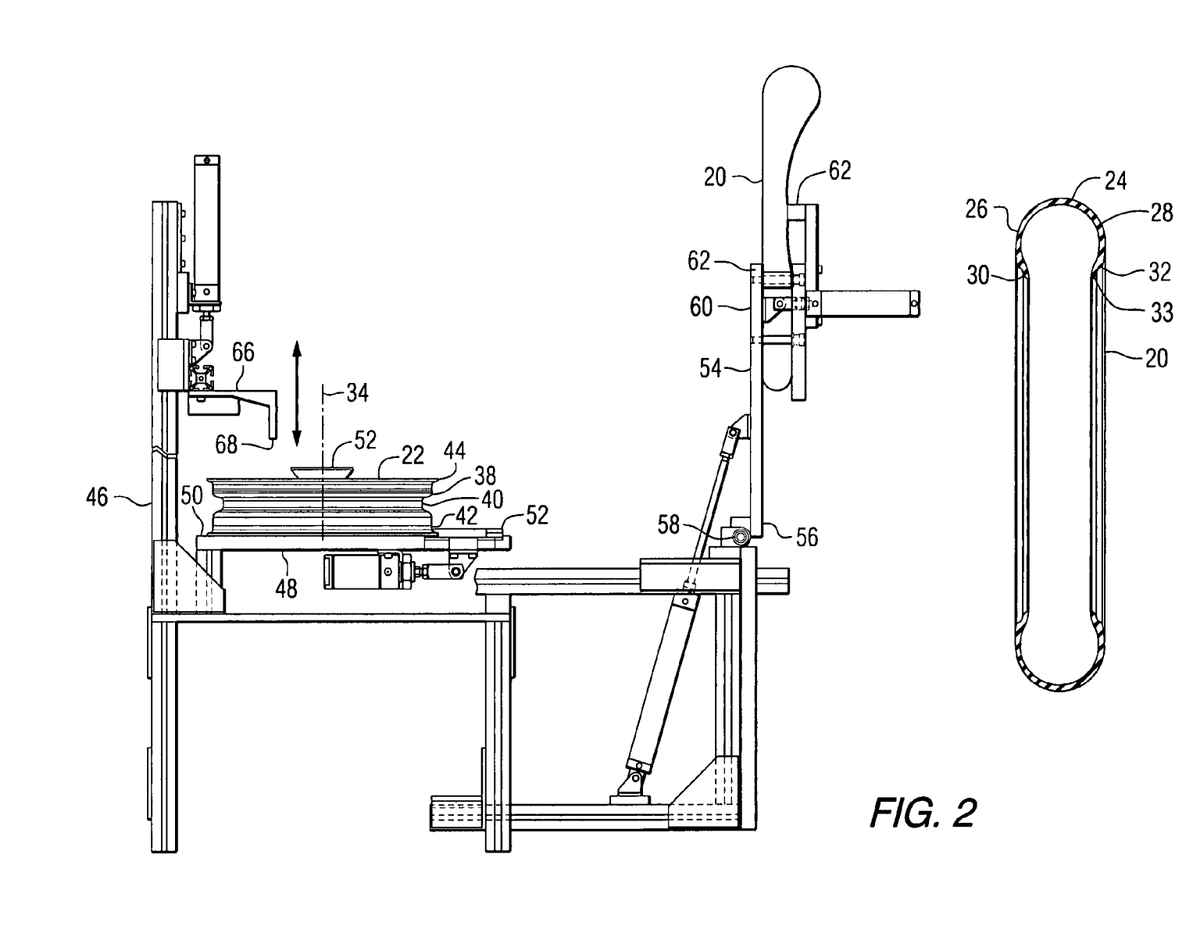
FIG. 2 shows the tire mounting device of FIG. 1 wherein the pivotal arm is in a vertical position with the fingers closed on an angular sector of a tire.
Figure 3:
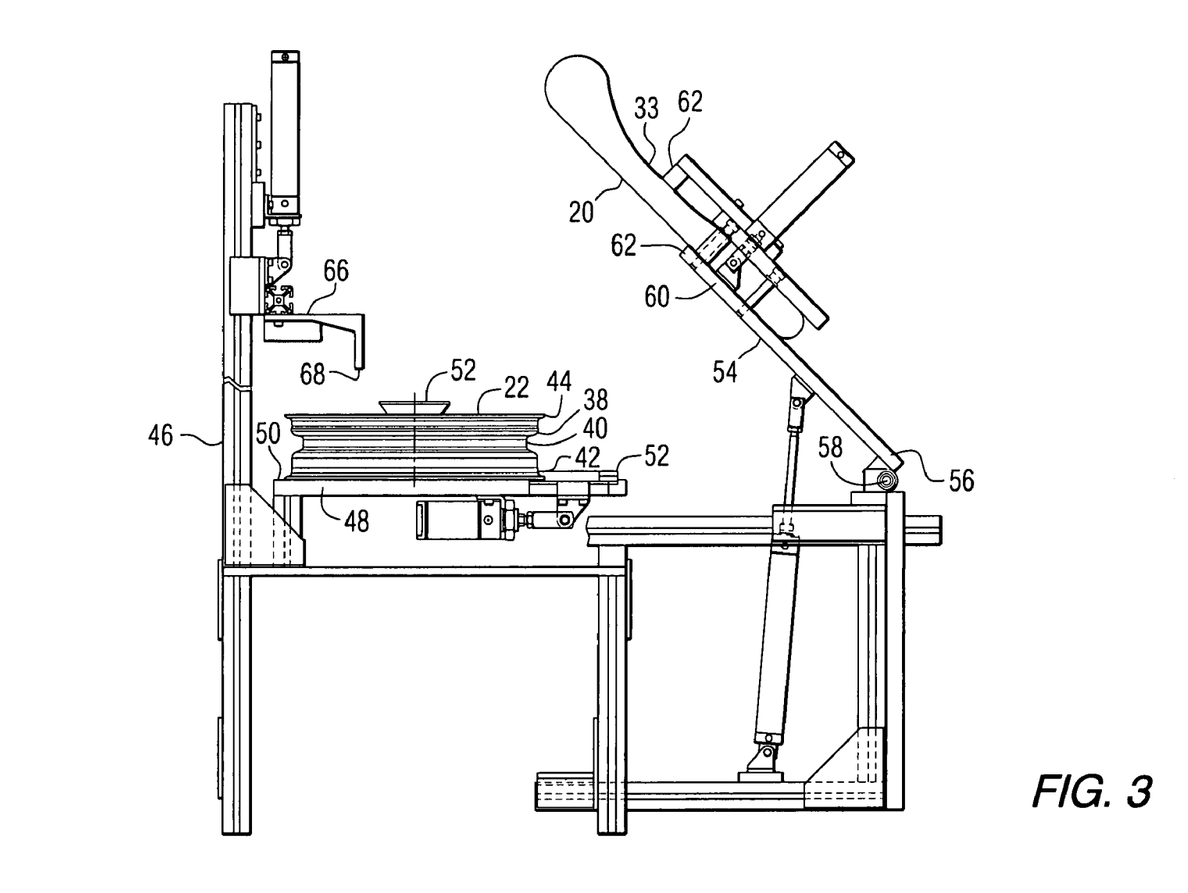
FIG. 3 shows the tire mounting device of FIGS. 1 and 2 wherein the pivotal arm is partially pivoted toward the mounting table.
Figure 4:
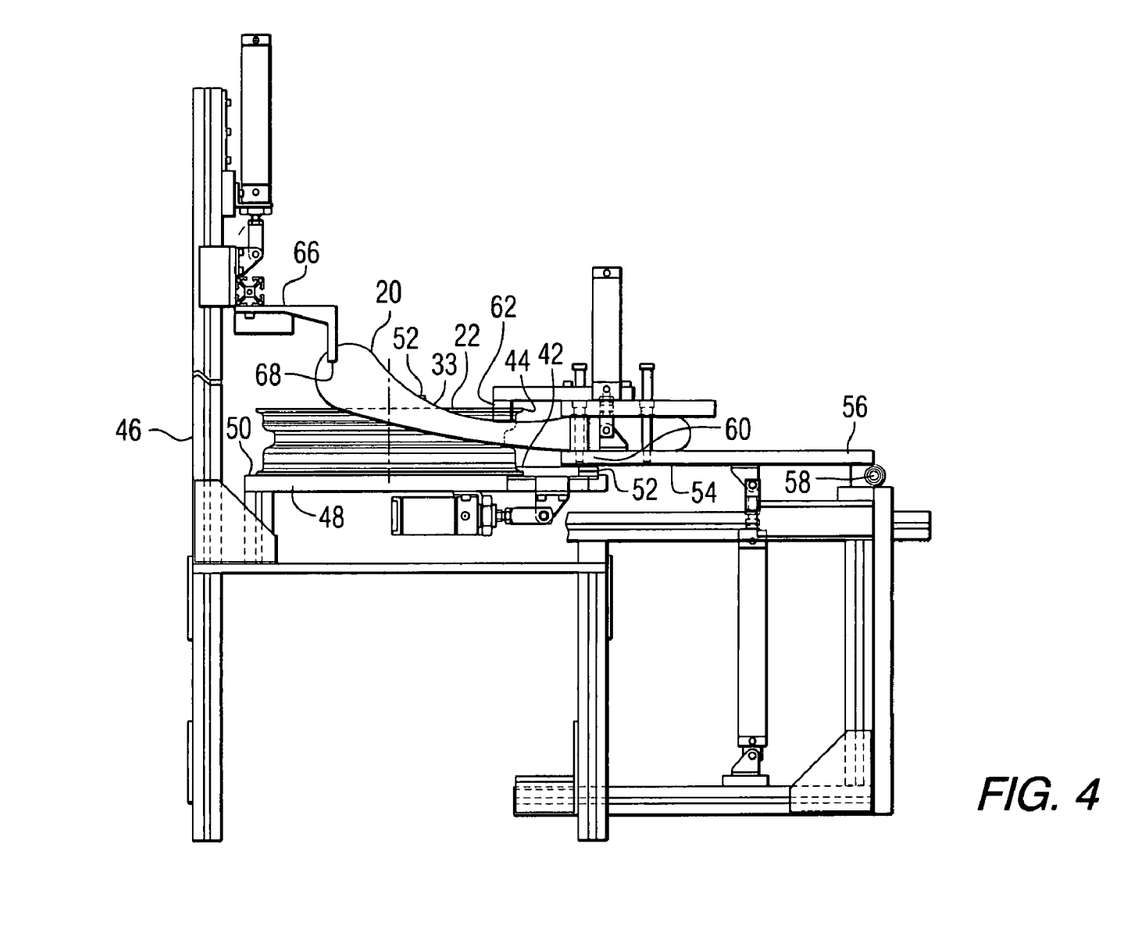
FIG. 4 shows the tire mounting device of FIGS. 1–3 wherein the pivotal arm is fully pivoted in the direction of the mounting table; and wherein the pivotal arm is located at a position that is away from the mounting table.
Figure 5:
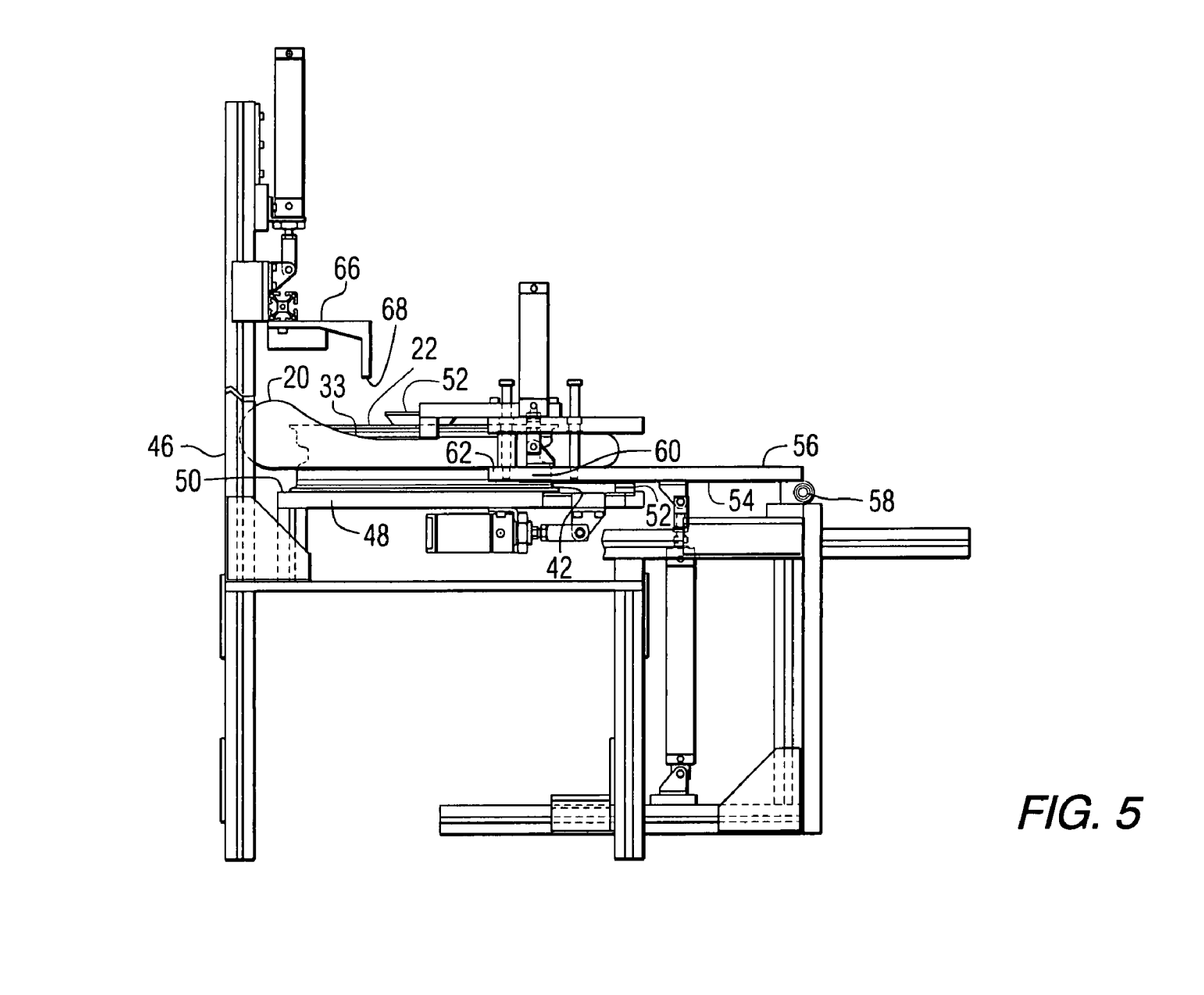
FIG. 5 shows the tire mounting device of FIGS. 1–4 wherein the pivotal arm is fully pivoted to the mounting table and wherein the pivotal arm is positioned radially adjacent to the mounting table.
Figure 6:
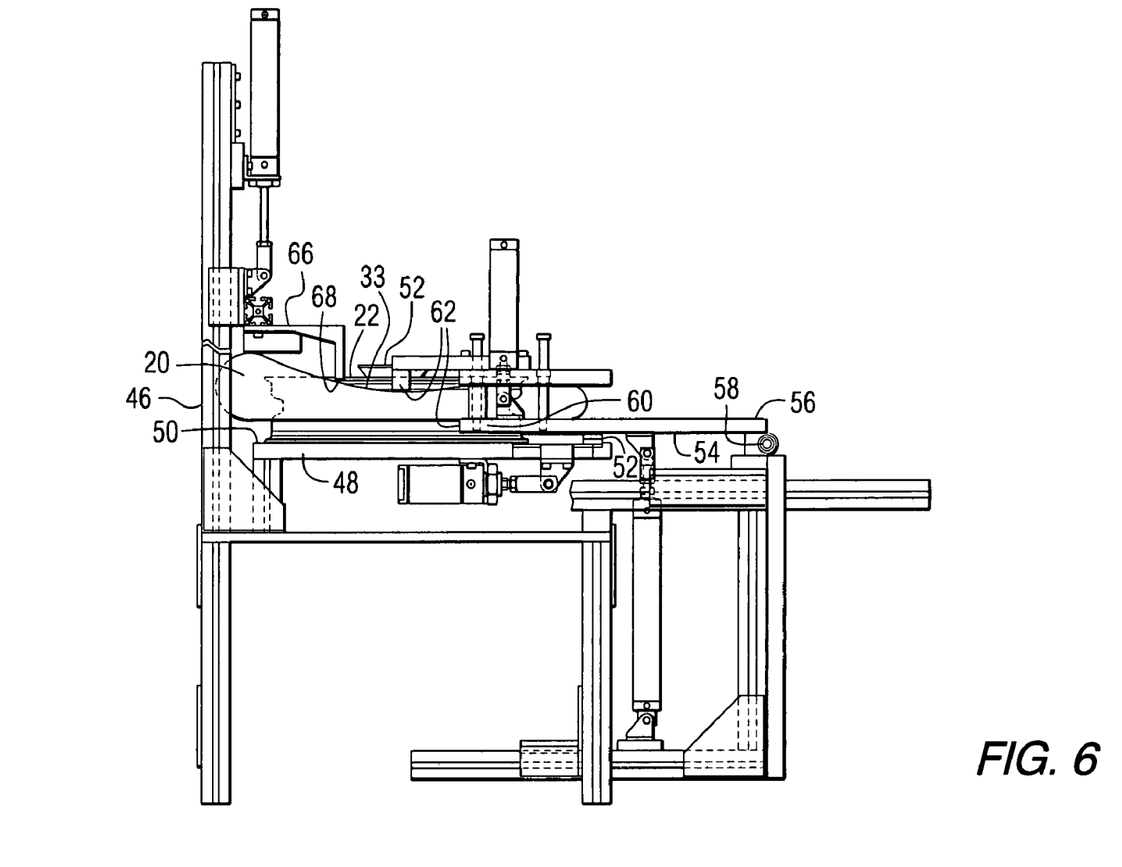
FIG. 6 shows the tire mounting device of FIGS. 1–5 wherein the press arm of the device is lowered to contact the tire.
Figure 7:
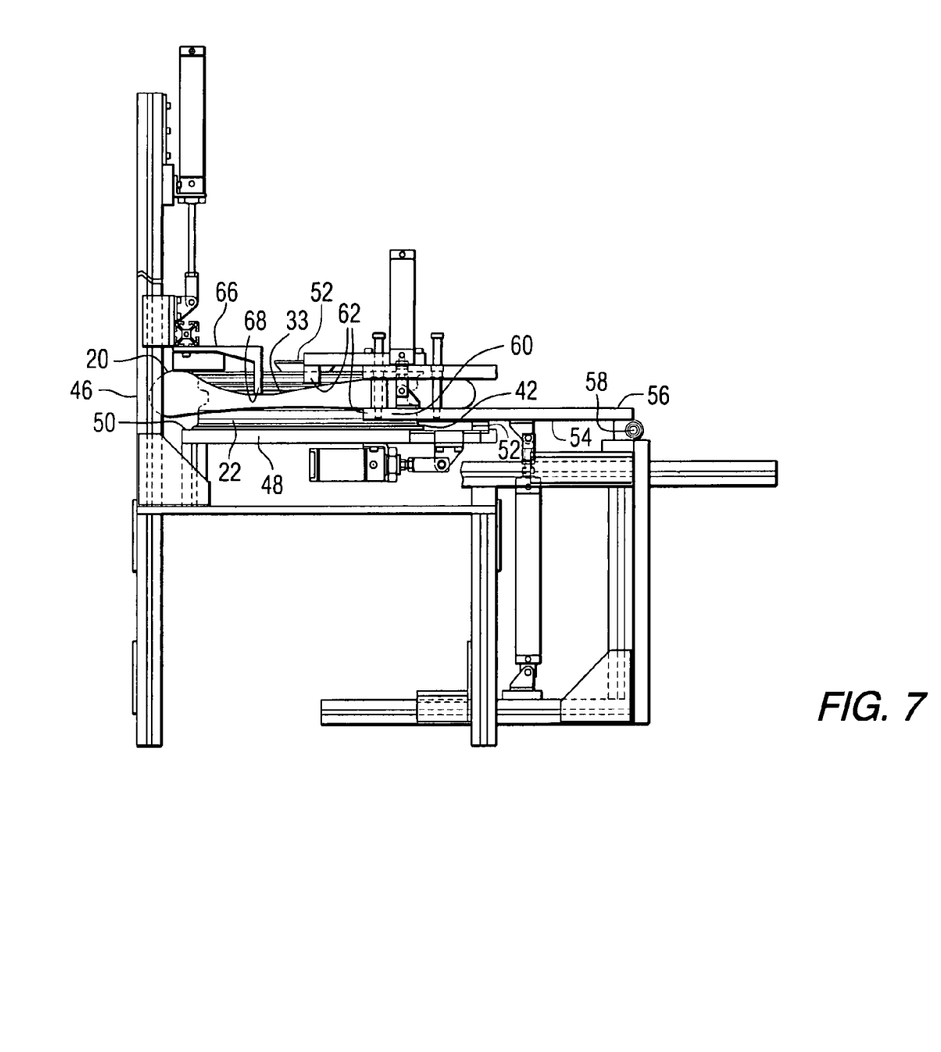
FIG. 7 shows the tire mounting device of FIGS. 1–6 wherein the press arm is further lowered so as to draw the inner and outer beads of the tire over the upper bead retainer wall of the wheel.
Figure 8:
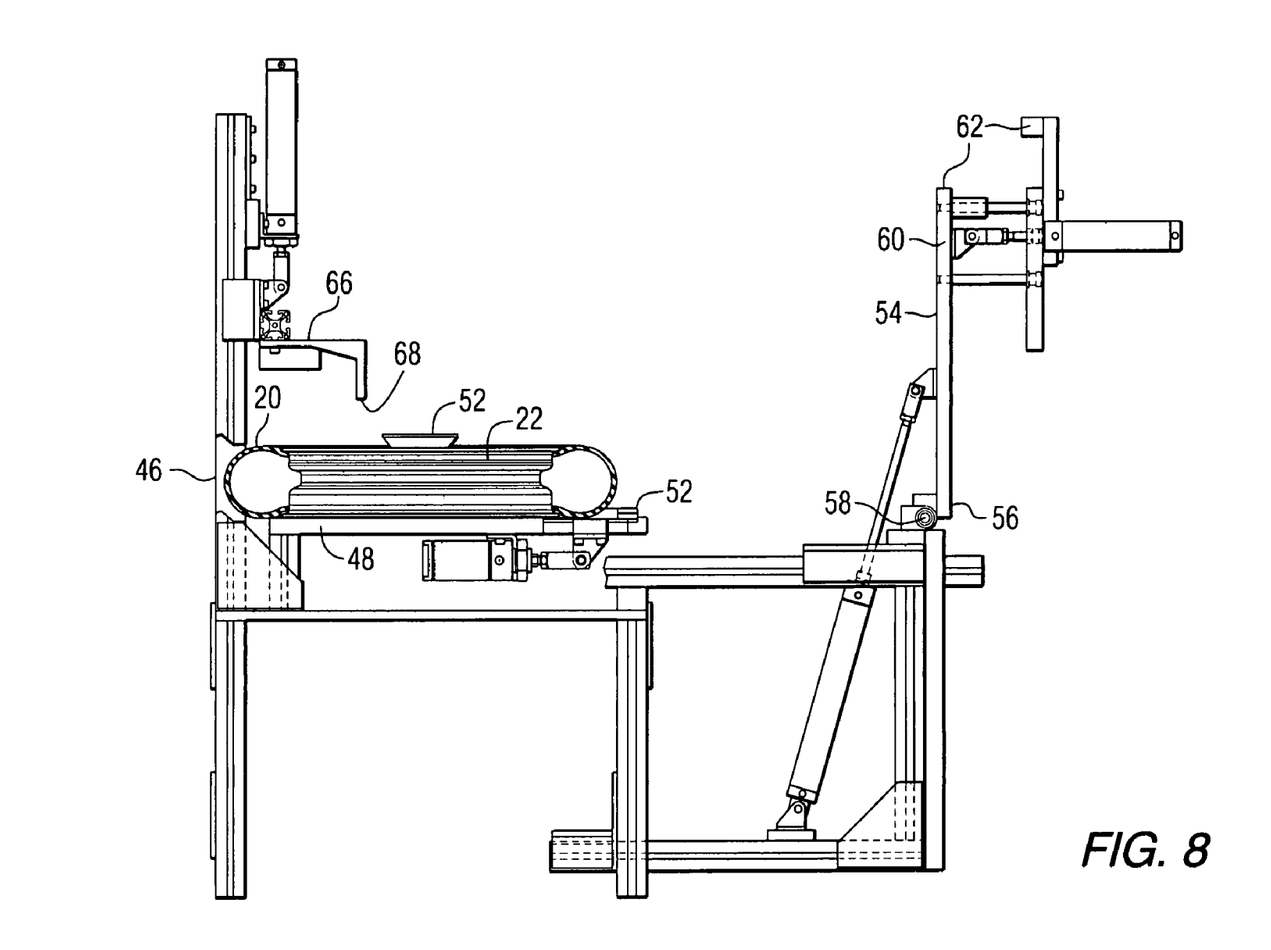
FIG. 8 shows the tire mounting device of FIGS. 1–7 wherein the pivotal arm is retracted and the fingers of the pivotal arm are released and the press arm is also retracted to allow the tire to return to its natural position.

As more particularly shown in FIGS. 1–4, pivot arm 54 clamps an angular sector of tire 20 and pivotally moves between a first position as shown in FIG. 1 and a second position as shown in FIGS. 4–7. In the first position, pivot arm 54 is angularly oriented with respect to the mounting surface 50 of mounting table 48 so as to receive a tire 20 to mount on wheel 22. In the second position as shown in FIG. 4, pivot arm 54 is substantially parallel to mounting surface 50 of mounting table 48.

Fingers 62 are opened and closed by pneumatic actuators that are controlled by a logic control system of the type that is well-known and understood by those skilled in the art. Fingers 62 are in the open position when pivot arm 54 is in the first position to receive a tire therebetween. The pneumatic actuators thereafter cause fingers 62 to close on tire 20 to secure tire 20 in the grip end 60 of pivot arm 54. Preferably fingers 62 clamp on an angular sector $\emptyset_1$ of tire 20 that is defined between angular positions marked by radiuses $R_1$ and $R_2$ of tire 20. Pivot arm 54 is then swung through an arc as shown in FIGS. 2 and 3 into the second position shown in FIG. 4.

When pivot arm 54 is in the second position with fingers 62 closed, the pivot end 56 of pivot arm 54 is moved from the open position shown in FIG. 4 to the closed position as shown in FIG. 5 and as herein previously described. The movement of pivot arm 54 from the first position to the second position moves tire 20 into a position over wheel 22 such that a portion of wheel 22 protrudes through porthole 33 of tire 20 and the angular sector $\emptyset_1$ of tire 20 that is defined between first radius $R_1$ and second radius $R_2$ is located laterally between the inner and outer bead retainer flanges 42 and 44 of wheel 22.

The pivot arm 54 is then moved from the open position shown in FIG. 4 to the closed position shown in FIG. 5 to cause bead surfaces 30 and 32 within sector $\emptyset_1$ to enter well 40 that is defined by wheel 22 and to contact wheel 20 between the inner bead retainer flange 42 and the outer bead retainer flange 44.

The tire changing device further includes a press arm or a button arm 66. Button arm 66 is slidingly connected to frame 46 and is angularly oriented with respect to mounting table 48 at an angular position that is substantially opposite from the angular position of pivot arm 54. Button arm 66 is moveable in a direction that is generally normal with respect to mounting surface 50 of mounting table 48. Button arm 66 includes a press end 68 that is moveable between a raised position as shown in FIGS. 1–5 and a lowered position as shown in FIG. 7. In the raised position of FIGS. 1–5, press end 68 is separated from said mounting surface 50 by a distance that is greater than the normal distance between the upper bead retainer flange 44 of wheel 22 and mounting surface 50 of mounting table 48. In the lowered position of FIG. 7, the normal separation between press end 68 and mounting surface 50 is less than the dimension between the upper bead retainer flange 44 and mounting surface 50.

FIG. 6 shows button arm 66 closing from the raised position of FIGS. 1–5 to the lowered position of FIG. 7 with pivot arm 54 in the second position. As particularly shown in FIGS. 6 and 7, with pivot end 56 closing toward mounting surface 50, button arm 66 engages a second angular sector $\emptyset_2$ of tire 20 that is located between angular positions marked by radiuses $R_3$ and $R_4$ of tire 20. As shown in FIG. 1, second angular sector $\emptyset_2$ is oriented on tire 20 in an angular position that is substantially opposite from the angular position of angular sector $\emptyset_1$. Button arm 66 continues to close toward mounting surface 50 so that press end 68 engages angular sector $\emptyset_2$ of tire 20 and temporarily distorts tire 20 such that the inner and outer bead surfaces 30 and 32 are drawn over outer bead retainer flange 44 and bead surfaces 30 and 32 within angular sector $\emptyset_2$ are laterally between inner bead retainer flange 42 and outer bead retainer flange 44 of wheel 22.

Thereafter, the movement of button arm 66 is reversed so that the separation between press end 68 and mounting surface 50 increases as button arm 66 returns to the raised position as shown in FIG. 8. As also shown in FIG. 8, fingers 62 of pivot arm 54 are opened and pivot arm 54 is returned to its open position by moving the pivot joint 58 away from mounting table 48. In this way, tire 20 is released by the tire mounting device and, through resiliency of tire 20, allowed to return to its original shape. Thereafter, chuck 52 is removed from wheel 22 and the tire 20 is inflated to the selected pressure.

Other various embodiments of the disclosed invention will be apparent from the foregoing description. However, the disclosed invention and the method for practicing the same are not strictly limited to the particular description of the preferred embodiment, but can otherwise be variously embodied within the meaning of the following claims.

We claim:

1. A tire mounting device wherein a tire is mounted to a wheel, said device comprising:
    a table for securing the wheel in fixed position;
    a gripper arm having a pivot end that is located laterally from said mounting table, said gripper arm also having a grip end that is located oppositely from said pivot end, said gripper arm pivotally moving between a first position wherein the pivot arm is angularly oriented with respect to said table and a second position in which said pivot arm is substantially parallel to the surface of said table, the pivot end of said gripper arm being translationally moveable between a radially open position and radially closed position at times when said gripper arm is in said second position, the gripper and of said pivot arm being moveable between an open position in which a tire can be placed into or out of the gripper end, and a closed position in which the gripper end of the gripper arm clamps the tire; and
    a button arm that is moveable between a first position in which the arm is away from the mounting table such that it is laterally outside the upper bead rim of the wheel; and
    a second position in which the arm is laterally between the upper and lower bead rims of the wheel.

2. The tire mounting device of claim 1 wherein said mounting table has a centering chuck to secure the wheel to said guide table.

3. The tire mounting device of claim 2 wherein aid gripper arm receives a tire at times when said gripper arm is in the first position and the gripper is open.

4. The tire mounting device of claim 3 wherein said gripper arm secures to a tire at time when the gripper arm is in the first position and the gripper is closed.

5. The tire mounting device of claim 1 wherein said gripper arm carries a tire from a first position of the gripper arm to the second position of the gripper arm.

6. The tire mounting device of claim 1 wherein said gripper arm is in the second position with the ends of the gripper being located laterally between the inner and outer bead retainer of the wheel.

7. The tire mounting device of claim 1 wherein the pivotal end of the gripper arm is positioned radially toward said table with a radial segment of the inner and outer beads of the tire being radially inside the inner and the outer bead retainer of the wheel.

8. The tire mounting device of claim 7 wherein a segment of the inner and outer beads of the tire are radially within the well of the wheel.

9. The tire mounting device of claim 8 wherein said segment of the inner and outer beads of the tire are urged against said wheel between the inner and outer bead retaining walls.

10. The tire mounting device of claim 1 wherein said press engages a second segment of said tire that is defined between third and fourth radiuses, said second segment being substantially oppositely despond from said first tire segment.

11. A tire mounting device wherein a tire is mounted to a wheel, said device comprising:
    a frame for supporting said mounting device;
    a mounting table that is supported on said frame, said mounting table having a mounting surface for supporting a wheel that is secured to said mounting table;
    a pivot arm having a pivot end and a grip end that is oppositely disposed on said pivot arm from said pivot end, said pivot arm being secured to said frame at a position on said frame that is located laterally from the mounting surface of said mounting table, the pivot end of said pivot arm being translationally moveable between an open position and a closed position, wherein the open position is laterally extended from said mounting table and the closed position is laterally closer to the mounting table than the open position, said pivot arm pivotally moving between a first position wherein the pivot arm is angularly oriented with respect to the mounting surface of said mounting table and a second position in which said pivot arm is substantially parallel to the mounting surface of said mounting table, the grip end of said pivot arm being moveable between an open position in which a tire can be placed into or out of the grip, and a closed position in which the tire is clamped in the grip end of the gripper arm; and
    a button arm that is moveable in a direction that is generally normal with respect to the mounting surface of the mounting table, said button arm having a press end that is moveable between a raised position and a lowered position, wherein in the raised position the press end is normally above the upper bead rim of a wheel that is mounted on the mounting table and in the lowered position the press end of the button arm is below the upper bead rim of a wheel that is mounted on the mounting table.

12. The tire mounting device of claim 11 wherein said mounting table has a centering chuck to secure the wheel to said guide table.

13. The tire mounting device of claim 12 wherein said pivot arm receives a tire at times when said pivot arm is in the first position and the gripper is open.

14. The tire mounting device of claim 13 wherein the gripper of said pivot arm is closed on a tire at times when the pivot arm is in the first position to secure a tire.

15. The tire mounting device of claim 11 wherein said pivot arm transports a tire from the first position of the pivot arm to the second position of the pivot arm.

16. The tire mounting device of claim 11 wherein the gripper end of said pivot arm is located between the inner and outer bead retainers of the wheels at times when said pivot arm is in the second position.

17. The tire mounting device of claim 11 wherein the pivotal end of the pivotal arm is positioned toward said table with an angular segment of the inner and outer beads of the tire being radially inside the inner and the outer bead retainer of the wheel.

18. The tire mounting device of claim 17 wherein a segment of the inner and outer beads of the tire are radially within the well of the wheel.

19. The tire mounting device of claim 18 wherein said angular segment of the inner and outer beads of the tire are urged against said wheel between the inner and outer bead retaining walls.

20. The tire mounting device of claim 11 wherein said button arm engages a second segment of said tire that is defined between third and fourth radiuses.

21. A method for mounting a tire on a wheel, said tire having inner and outer side walls that define inner and outer bead surfaces, and said wheel having inner and outer bead retaining wall that oppose said inner and outer tire beads at times when the tire is mounted on the wheel; said method comprising the steps of:

placing the tire over the wheel in an axial direction such that a first segment of said tire that is defined between first and second radiuses is located laterally between the inner and outer bead retainer walls of said wheel;

urging the tire radially toward the wheel such that the inner and outer beads of the tire within said first sector contact the wheel between the inner and outer bead retainer;

pressing the inner and outer beads in a second sector of said tire over the inner bead retainer of said wheel;

said second sector of said tire being located on the opposite side of said tire from said first sector; and releasing the first sector and the second sector of said tire.

22. The tire mounting method of claim 21 wherein said tire is urged against said wheel such that the tire is deformed to bring the tread of said tire within a distance of one-half of the radial dimension between the initial inner radius and the initial outer radius of said tire.

23. A method for mounting a tire on a wheel, said tire having inner and outer side walls that respectively define an inner bead surface and an outer bead surface, said inner bead surface cooperating with said outer bead surface to define an aperture in said tire, said wheel having inner bead retaining wall and an outer bead retaining wall, said inner and outer bead retaining walls opposing said inner and outer tire beads at times when the tire is mounted on the wheel; said method comprising the steps of:

placing the tire over the wheel such that a first segment of said tire that is defined between first and second radiuses is located laterally between the inner and outer bead retainer walls of said wheel and a portion of said wheel intersects a portion of the aperture of said tire;

urging the tire radially toward the wheel such that the inner and outer beads of the tire within said first sector contact the wheel between the inner and outer bead retainer;

pressing a second angular sector of said tire in a direction that is generally parallel to the axis of rotation of said wheel, the second angular sector of said tire being located at an angular position on said tire that is substantially opposite from the angular position of the first angular sector, said second angular sector of said tire being pressed until the inner and outer beads of the tire in said second sector pass over the inner bead retainer of said wheel;

releasing the first sector and the second sector of said tire; and inflating said tire to a given pressure.

24. The tire mounting method of claim 23 wherein said tire is urged against said wheel such that the tire is deformed to bring the tread of said tire within a distance of one-half of the radial dimension between the initial inner radius and the initial outer radius of said tire.

* * * * *